INVENTORS
C.A.FRISCHE
T.M.FERRILL JR.
J.M.SLATER
BY
THEIR ATTORNEY

Patented Mar. 9, 1948

2,437,251

UNITED STATES PATENT OFFICE 2,437,251

STABILIZED RADIO DIRECTION FINDER AND HOMING DEVICE

Carl A. Frische, Great Neck, Thomas M. Ferrill, Jr., Hempstead, and John M. Slater, Garden City, N. Y., assignors to The Sperry Corporation, a corporation of Delaware Application August 21, 1943, Serial No. 499,468

12 Claims. (Cl. 250—11)

This invention relates to direction finders for dirigible vehicles, such as aircraft and ships.

An object of the invention is to improve the performance of radio direction finders by reducing the errors thereof produced by pitching and rolling or banking of the craft on which they are mounted. Our invention has special application to automatic direction finders and to radio homing automatic pilots wherein the craft, e. g. an airplane, is steered automatically with reference to the position of a radio transmitting station. We have, therefore, shown our invention as applied to automatic direction finders and radio homing devices, although it also has application to all types of radio direction finders.

We have discovered that the direction finder is susceptible to error due to pitching and banking, which becomes serious as the aircraft nears the transmitting station, probably because the radio signals arrive with inclined wave fronts. To reduce this error, we propose to stabilize the direction finder loop in such a manner as to maintain the axis of rotation vertical.

Another object of the invention is to improve radio homing automatic pilots to steer toward a transmitter along a predetermined straight ground track, regardless of cross winds.

Referring to the drawings, illustrating several forms our invention may assume,

Fig. 3 shows a side elevation of another form of mounting for the radio loop and a modified system for obtaining control signals therefrom.

Fig. 4 is a wiring diagram of part of the system of Fig. 3.

Fig. 5 is a diagram illustrating the problem of radio homing in presence of a side wind.

Figure 1:
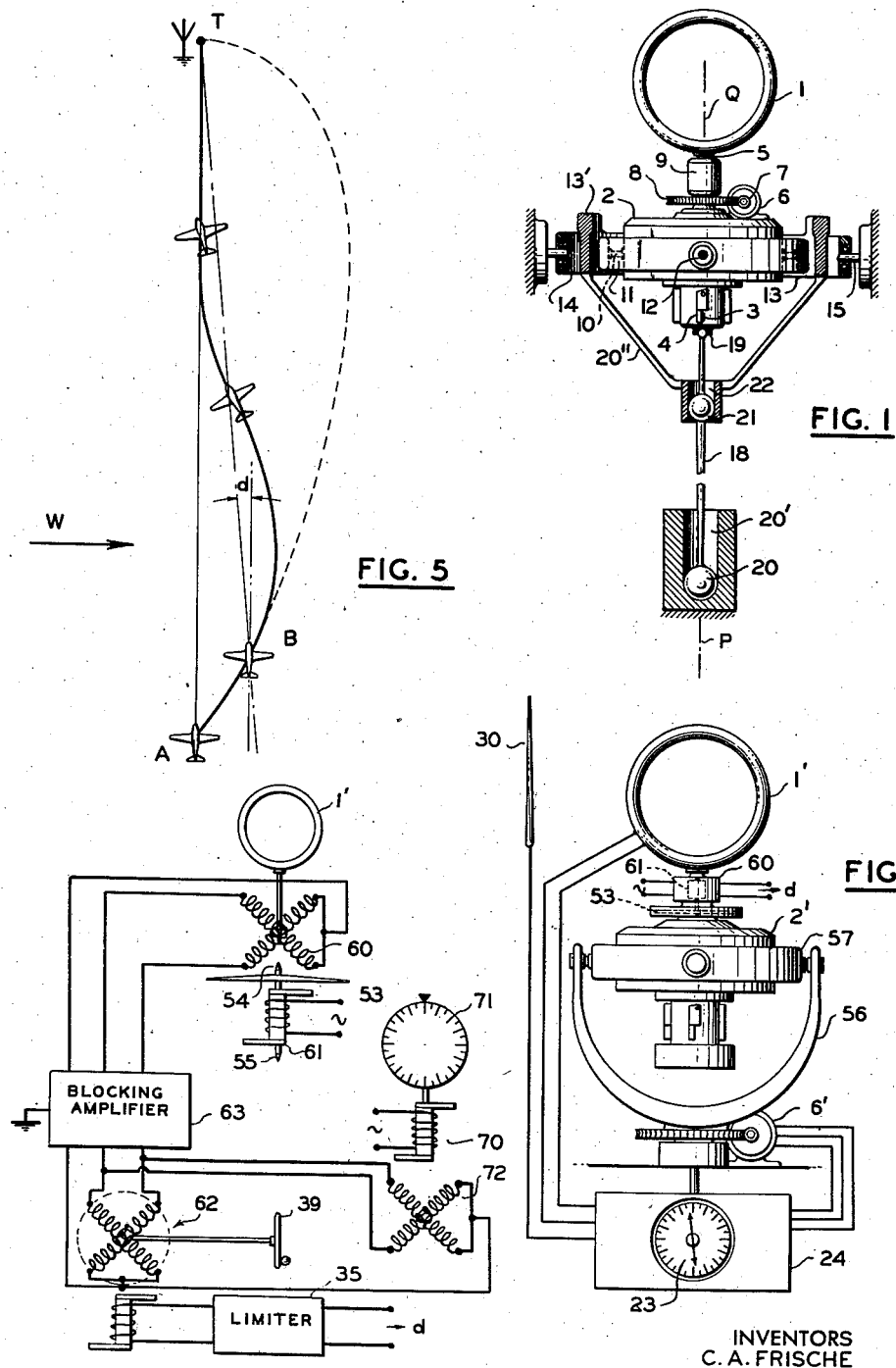
Fig. 1 shows a side elevation of a direction finding loop stabilized by being mounted on a gyro-vertical in connection with our improved means for eliminating gimbal error.

Referring first to Fig. 1, we have shown a typical radio direction finder loop 1 stabilized by being directly mounted on the casing 2 of a suitable form of gyro-vertical, although obviously the same result may be secured by indirect stabilization from a gyro-vertical. Many forms of such gyro instruments are known in the art, the one illustrated being erected by air jets 3 and auxiliary pendulums 4, as is well known in the art. If the loop is associated with an automatic direction finder or homing automatic pilot, or both, we prefer to also mount the loop for rotation about a vertical axis on the craft. For this purpose the loop is shown as mounted on a vertical shaft 5 journaled in a boss on top of the gyro casing and rotated from a power motor 6 through means such as worm 7 and worm wheel 8. A Selsyn transmitter 9 is also shown on said shaft, to act as the transmitter of loop position, as will be hereinafter explained.

Conventional Cardan type gimbals, normally employed in gyro mountings, are subject to a small inherent error, due to the fact that a combined pitching and rolling motion of the craft produces, through the gimbals, a small deflection in azimuth of the object stabilized by the gimbals.

This spurious deflection (the so-called gimbal error or false yaw error) is small but it is variable and not negligible. In our apparatus, this error is minimized by employing a modified form of gimbal mounting which comprises, in effect, two Cardan type gimbal systems one within the other, mutually displaced by 90 degrees, and means for keeping the systems in the proper relative position to minimize said error.

As shown (Figs. 1 and 2), the gyro casing is mounted for oscillation about a minor axis 10 in an inner ring 11, which in turn is mounted for oscillation about a major axis 12—12 in an intermediate ring 13. The intermediate ring is mounted for oscillation with respect to an outer ring 14, about axis 12. Thus all three rings are free to move relative to each other on axis 12. The outer ring is pivoted at 15 for oscillation with respect to a part fixed to the craft.

In order to keep the rings in correct angular relation a guide rod or lever 18 is provided, universally connected at its upper end to the bottom of the gyro casing, as by a ball-and-socket connection 19. The lower end of the rod carries a ball 20 sliding in a socket 20' fixed with respect to the craft. Intermediate the ends of the rod is secured a ball 21. The distance between the centers of balls 19 and 21 is made substantially equal to the distance between the center of ball 19 and the intersection of axes 10 and 12. Ball 21 slides in a tubular guide 22 carried by a yoke or bail 20" secured to ring 13. Counterweights 13' serve to counterbalance the yoke. If desired the yoke can be pivoted at axis 12 directly, and the ring 13 omitted.

As stated, the gimbal system comprises in effect two Cardan gimbal systems, one within the other and displaced relative to each other by 90 degrees; one comprising the gyro case and the inner ring 11 and the other the outer ring 14 and the support for axis 15.

The function of rod 18 and yoke 20'' is apparent if the base of the gimbal assembly of Fig. 1 be considered (for purposes of illustration) to rotate about its principal axis P, as by turning of the aircraft. The loop also rotates, through the agency of the gimbals, about its principal axis Q which in general makes an angle other than 180 degrees with respect to axis P. The intermediate axis 12 rotates in a plane, and the function of the rod 18 and yoke 20'' is to keep the axis of this plane of rotation in bisecting relation to the axes P and Q. Thus the error introduced by one gimbal system is canceled by an equal and opposite error of the other gimbal system. The greater the ratio of arm 20—21 of the rod to arm 21—19 (arm 21—19 being kept equal to the distance between 19 and the intersection of axes 10 and 12), the more nearly is the gimbal error eliminated, but in practice this ratio can be conveniently low while the error is nevertheless rendered negligible.

By this arrangement the slight twist which would otherwise be given the gyro rotor case about the vertical axis upon combined pitching and rolling movement of the craft is substantially eliminated and the error otherwise caused thereby greatly reduced.

Figure 2:
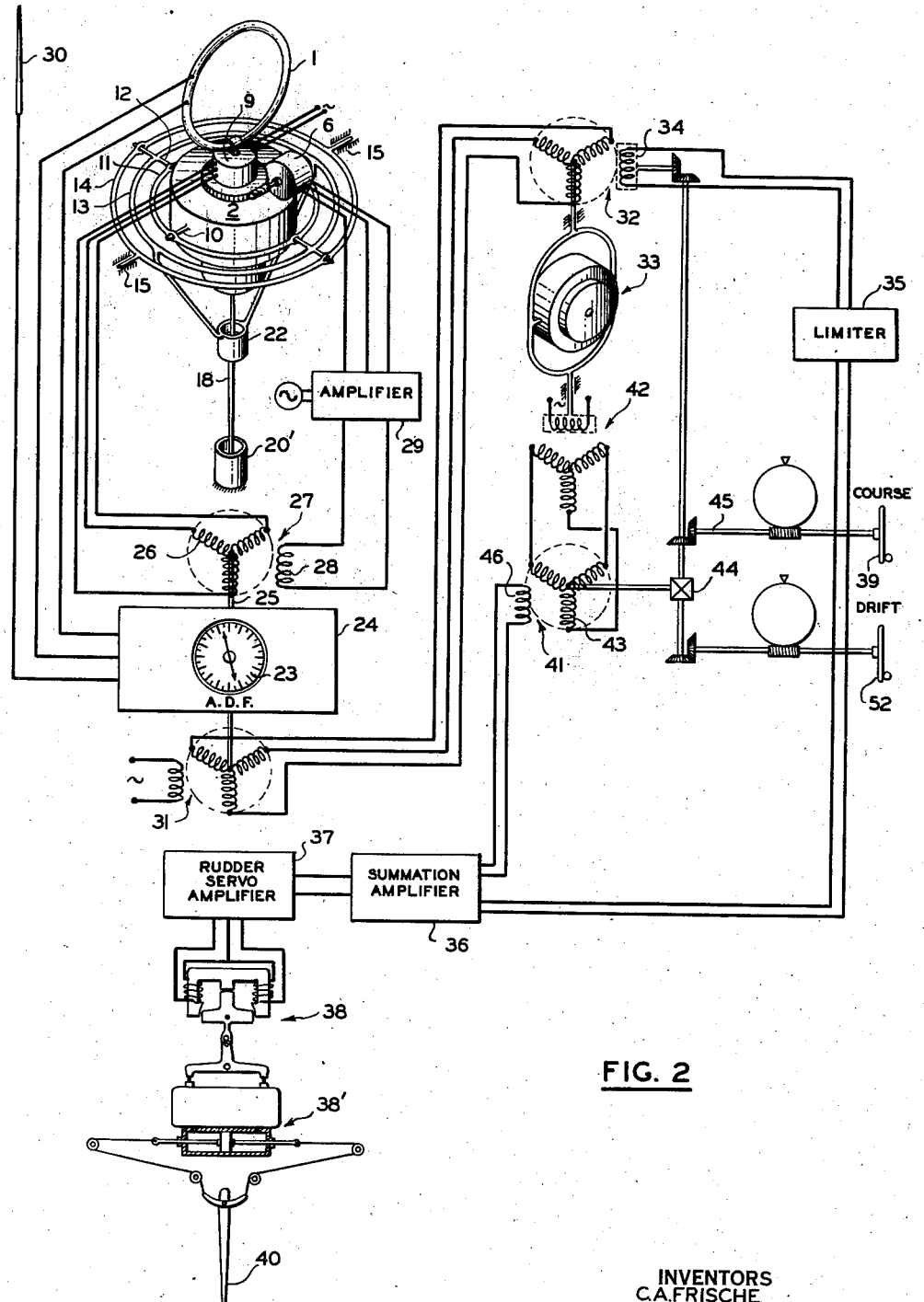
Fig. 2 is a diagrammatic view and wiring diagram of an automatic direction finder and a radio homing automatic pilot employing the form of our invention shown in Fig. 1.

Fig. 2 shows the invention as applied to an automatic radio direction finder system and also to a radio homing automatic pilot, the same type of gyroscopic mounting being shown as in Fig. 1. The motor 6 in this instance is shown as actuated from an error signal produced by any change in the position of the indicator 23 on the radio bearing receiver 24 of the direction finder with respect to the orientation of loop 1 on the craft. For this purpose the output shaft 25 of the automatic direction finder receiver 24, has one element 26 of a Selsyn signal generator 27 connected thereto, the windings of which are connected with Selsyn transmitter 9 on the loop so that any difference in position between the two causes a signal to be generated in the output winding 28 of Selsyn 27 which feeds into a phase sensitive amplifier 29, the output of which actuates the reversible power motor 6.

The automatic direction finder may be of the form shown in the patent to Francis L. Moseley, No. 2,257,757, dated October 7, 1941, for Radio compass navigation apparatus, with the details of which this invention is not concerned. According to this invention, the output of the loop, combined with the output of a non-directional antenna 30 (to make the output phase sensitive and to eliminate the 180 degree ambiguity), is fed into the receiver 24, on which the indicator 23 is placed showing the direction of the receiving station, and which also maintains the loop faced toward the receiving station, so that the output is null, through motor 6 and a followback connection (electrical or mechanical) to the receiver 24.

We have also shown our system as actuating an automatic radio homing steering device, for which it is especially adapted and having certain novel features. Referring to Fig. 5, it will be seen that if the craft A is originally headed toward the transmitting station T and is blown by cross-wind W, or otherwise deviates from this course to a position B, the automatic direction finder will turn the loop through an angle $d$ so as to keep it pointed toward the transmitting station, the angle $d$ being the difference between the craft's original heading, as maintained by the directional gyroscope, and the loop position. It will therefore generate a signal proportional to this displacement, as by means of a Selsyn transmitter 31 on the shaft 25 of the automatic direction finder 24 and the Selsyn signal generator 32 connected to some direction maintaining instrument such as directional gyroscope 33, which may be the standard directional gyroscope used in the automatic pilot system of the craft. A signal will therefore be generated in the output winding 34, proportional to angle $d$, which signal is fed through a voltage limiter 35, summation amplifier 36 and thence to rudder servo amplifier 37 which, through servo 38, turns the rudder 40. A course change handle 39 is also shown as connected to the winding 34 through shafts 45 and 51 for changing course.

To proportion the amount of course change to the strength of the signal generated in output winding 34, we oppose such signal by a second signal proportional to the change in heading of the craft resulting from the signal 34. For this purpose we have shown a second Selsyn signal generator 41 operatively connected with a Selsyn transmitter 42 on the directional gyroscope, one winding 43 of generator 41 being settable in accordance with the desired heading from the handle 39, through differential 44 and shaft 45, which adjusts the position of the winding 43 with reference to the output winding 46. If, therefore, the craft changes course due to a signal in 34, a counter signal will be generated in winding 46 which is mixed with the signal from 34 in the summation amplifier 36 to limit the amount of course change.

Preferably, however, in order to quickly set up a proper drift angle in the presence of a cross wind, the relative strength of the signal in winding 34 per degree of the displacement angle $d$, as compared to the signal generated in winding 46, per degree of heading change, is made greater so that a greater change of course is effected than the angle $d$. In order, however, to prevent the possibility of the craft going into a complete turn, we interpose in the connections between the signal 34 and the summation amplifier a voltage limiter 35 (of any known design) to limit its maximum output to a signal not greater than the signal generated in winding 46 when the craft is off course 90 degrees.

The system between the limiter 35 and the rudder need not be shown in detail, as such systems are well known in the art, a similar system being shown in the copending application of C. A. Frische, P. Halpert and J. R. Wilkerson, Serial No. 452,662, filed July 28, 1942, for Automatic pilot with automatic banking, now Patent No. 2,415,430. We have shown the system as comprising a rudder servo amplifier 37, electro-hydraulic relay 38 and servo motor 39'.

In Figs. 3 and 4 we have shown a modified method of stabilizing the loop and obtaining signals therefrom for operating either or both automatic direction finder and automatic homing device. In this system, the direction maintaining means as well as the loop is mounted directly on the gyroscope 2' so as to be stabilized thereby and is shown in the form of a magnetic compass 53 instead of a directional gyroscope. Preferably, the compass needle is pivoted about a vertical axis by top and bottom pivots 54 and 55, so that its axis is always in line with the vertical rotational axis of loop 1'. A signal proportional to the angle $d$ may therefore readily be obtained without gimbal error and without the linkage system 19—20—21 of Fig. 1, because both the loop and the direction maintaining means are mounted on the same stibilized platform and are pivoted about a truly vertical common axis. The signal from the loop 1', as before, operates the automatic direction finder 24, the power motor 6' which orients the same being shown, in this instance, positioned at the base of the gyro gimbal mounting instead of directly on the gyroscope, as in Fig. 1. Motor 6' rotates the U-shaped bracket 56 within which the gyroscope is pivoted on the single gimbal ring 57, the vertical shaft of the bracket being shown as extending to the radio direction finder box 24 so as to turn the dial 23, thus avoiding the use of the electrical follow back motors 9 and 27 of Fig. 2.

To obtain the displacement signal in this case, we have shown a Telegon transmission system such as shown in the patent to L. F. Carter and W. Anscott, No. 2,300,404, for Remote reading magnetic compass, or the copending application of Brock A. Somers, Serial No. 454,072, filed August 7, 1942, for Isolation amplifiers for self-synchronous systems, now Patent No. 2,356,186. According to our invention, we place the field 60 of the Telegon transmitter on the rotating base of the loop 1', so as to be turned therewith, and we connect the Z-shaped armature 61 of the Telegon to the magnetic needle so as to be oriented thereby, the coaxial winding around said armature being supplied with alternating current. We may, therefore, operate a Telegon repeater device 62 as a signal generator from the output of the winding 60 through blocking amplifier 63 to prevent any reaction occurring on the magnetic compass. The signal generator device 62 may be used to produce a signal analogous to the signal produced by the winding 34 of Fig. 2, and in a similar fashion the course setting may be introduced therein by displacing one winding of repeater 62, with respect to the other winding thereof, from the course setting knob 39. Such a use of a Telegon is shown in Fig. 8 of the aforesaid Somers application. The remainder of the system may be substantially similar to that shown in Fig. 2 of our application.

We may also readily actuate from the transmitter 53 a compass radio bearing indicator 70 merely by mounting a compass card 71 on the armature of a Telegon repeater motor 72, the field of which is connected to leads from the blocking amplifier 63 and the armature winding of which is excited from the same alternating current source as the winding on the armature 61 of the Telegon transmitter. It may be noted that the reading of the indicator 70 showing the compass bearing of the radio station will be free of gimbal error, since the gimbal error is eliminated by the fact that the angle $d$ is measured between the magnetic needle and the loop 1' which operate about a common vertical axis. The needle remains fixed on the magnetic meridian, and the loop is held facing the transmitter by the motor 6'.

Our invention is, of course, applicable to other types of automatic direction finders and other types of radio homing devices than shown herein. Thus, it is equally applicable to the type of radio homing device shown in the copending application of Bert G. Carlson, Serial No. 32,193, filed July 19, 1935, now Patent No. 2,372,184, in which systems no automatic direction finder, as such, is employed, but the loop is held fixed in azimuth from a directional gyro or other direction maintaining means and the signal proportional to angle $d$ is therefore given by the output of the loop itself, which changes the course steered by the automatic pilot to bring the craft back to its original course.

In using our invention as a radio homing device, it will be understood that the usual procedure would be to start the craft headed directly toward the transmitting station, the position of which is indicated by the indicator 23, by the manipulation of the usual change course handle 39. After the craft is started on this course, the navigation may be turned over to the automatic pilot, which will maintain the craft on the straight ground course as described.

If strong cross winds are present, the arrival at the correct drift angle may be expedited by the preliminary adjustment of the drift handle 52 to set in the approximately correct angle, but whether or not this handle is operated, the craft will ultimately be brought back on the straight ground track, as explained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a radio direction finder for a movable craft, a universally mounted rotatable direction responsive antenna, a gimbal mounting therefor, and gyroscopic means for maintaining the axis of rotation of said antenna vertical during rolling and pitching of the craft.

2. In an automatic direction finder system, a universally gimballed and stabilized direction finder loop, a separately mounted radio bearing indicator operated therefrom, motive means operated from the output of said loop for both positioning said bearing indicator and maintaining the loop facing toward the transmitter, and means preventing errors otherwise due to the gimbal mounting of the loop from causing false indications of the indicator.

3. In an automatic direction finder, a universally gimballed and stabilized direction finder loop, a separately mounted radio bearing indicator operated from the output of said loop, and means for orienting said loop from said indicator including a power motor for rotating said loop and a signal generating system between said indicator and said loop for causing rotation of said power motor upon loss of synchronism between said loop and indicator.

4. In an automatic direction finder system, a rotatably mounted direction finder loop, a gyro-vertical by which said loop stabilized, separately mounted direction maintaining means, a signal generating system including transmission means on said loop and transmission means on said direction maintaining means generating a signal upon relative displacement of the same, the gimbal mounting of said loop including a plurality of gimbal rings and a linkage system connecting the loop mounting, an intermediate gimbal and the base, so constructed and arranged as to prevent azimuth gimbal error from creating false signals in said transmission system.

5. In an automatic direction finder system, a gyroscopically stabilized universal mounting, a direction finder loop mounted thereon, a direction maintaining means also mounted thereon for freedom about a vertical axis independent of said loop, means for generating a signal upon relative displacement of said loop and direction maintaining means for automatically steering the craft, an automatic direction finder operated from the output of said loop, and motive means operated from said automatic direction finder for maintaining the loop pointed toward the transmitting station.

6. In a radio direction finder for a movable craft, a direction responsive antenna, a direction maintaining means, each mounted for orientation in azimuth, a common gimbal mounting for both, gyroscopic means for preventing inclination of said antenna and direction means during rolling and pitching of the craft, and means for generating a signal responsive to relative orientation of said antenna and direction means.

7. In a radio direction finder, a directional antenna having a principal axis which is desired to be kept vertical, support means for the antenna, a gimbal mounting for the antenna support means, and gyroscopic means for maintaining the principal axis of the antenna vertical during pitch and roll of the craft; said gimbal mounting comprising an inner ring pivoted to the antenna support means about a normally horizontal axis normally at right angles to the principal axis of the antenna, an outer ring pivoted to the inner ring about a second normally horizontal axis, normally in the plane of the first horizontal axis and at right angles thereto, base means normally in fixed relation to the craft and pivoted to the outer ring about an axis normally coincident with said first horizontal axis, and means for constraining movement of said second normally horizontal axis, upon rotation of the gimbal mounting, to a plane the perpendicular axis of which is in substantially bisecting relation to the principal axes of the antenna and the base.

8. A universal mounting for supporting a body with respect to a base, comprising a first gimbal ring mounted in journals fixed to said base for movement about a first journal axis, a yoke pivotally connected to said first gimbal ring through journals along a second journal axis substantially perpendicular to said first journal axis, a second gimbal ring also journaled for freedom relative to said first gimbal ring about said second journal axis, a universally movable body pivotally supported through journals in said second gimbal ring along an axis substantially perpendicular to said second journal axis, and means flexibly coupled to said yoke and also flexibly coupled to said base and said universally movable body for constraining said first gimbal ring to rotate about said first journal axis through a predetermined extent relative to the extent of rotation of said universally mounted body about said journals in said second gimbal ring.

9. In a radio direction finder, a direction-responsive antenna, a direction maintaining means, each mounted for orientation in azimuth independent of the other, a common gimbal mounting for said direction-responsive antenna and said direction maintaining means, means for stabilizing said direction-responsive antenna and said direction maintaining means to prevent inclination thereof, means for orienting said radio-direction finder antenna according to signals received therethrough, and means coupled both to said direction-responsive antenna and also to said direction maintaining means for generating a signal responsive to relative orientation of said antenna and said direction maintaining means.

10. In a radio direction finder system, a gyroscopically stabilized universal mounting, a direction finder antenna mounted thereon, magnetic field responsive direction maintaining means also mounted thereon for freedom about a vertical axis independent of said antenna, radio receiving means coupled to said antenna, means for orienting said antenna in accordance with the intensity of radio signals received therethrough, and means for generating a signal in accordance with the relative displacement of said antenna and said magnetic field responsive direction maintaining means for detecting the magnetic bearing of a radio transmitting station received by said radio receiving means.

11. Apparatus as defined in claim 10, wherein said magnetic field responsive direction maintaining means comprises a double-pivoted permanent magnet compass.

12. In a radio direction finder for a craft, in combination, a direction responsive antenna; a mounting therefor including a base, a first gimbal element pivoted in said base for rotation about a first axis, a second gimbal element pivoted in said first gimbal element about a second axis and supporting said direction responsive antenna through a pivotal connection for rotation therein about a third axis normally substantially parallel with said first axis; means for maintaining said antenna vertical during rolling and pitching of the craft; and means for regulating the relative rotation of said first gimbal element and said base about said first axis in accordance with the relative rotation of said antenna and said second gimbal element about said third axis.

CARL A. FRISCHE.
THOMAS M. FERRILL, Jr.
JOHN M. SLATER.

REFERENCES CITED

The following references are of record in the file of this patent:

UNITED STATES PATENTS

| Number | Name | Date |
|---|---|---|
| 2,201,174 | Harding et al. | May 21, 1940 |
| 2,207,709 | Bates | July 16, 1940 |
| 2,257,757 | Moseley | Oct. 7, 1941 |
| 2,288,102 | Meredith | June 30, 1942 |
| 2,315,755 | Warner | Apr. 6, 1943 |
| 1,569,325 | Leib | Jan. 12, 1926 |
| 2,369,622 | Toulon | Feb. 13, 1945 |
| 1,726,643 | Borresen | Sept. 3, 1929 |
| 2,366,543 | Meredith | Jan. 2, 1945 |
| 1,825,345 | Fieux | Sept. 29, 1931 |